US010045512B2

(12) United States Patent
Mainini et al.

(10) Patent No.: US 10,045,512 B2
(45) Date of Patent: Aug. 14, 2018

(54) SYSTEMS AND METHODS FOR MONITORING A SUBJECT IN A PREMISE

(71) Applicant: Radio Systems Corporation, Knoxville, TN (US)

(72) Inventors: Christopher Mainini, Knoxville, TN (US); Richard Alan Seltzer, Knoxville, TN (US)

(73) Assignee: RADIO SYSTEMS CORPORATION, Knoxville, TN (US)

( * ) Notice: Subject to any disclaimer, the term of this patent is extended or adjusted under 35 U.S.C. 154(b) by 0 days.

(21) Appl. No.: 14/741,159

(22) Filed: Jun. 16, 2015

(65) Prior Publication Data

US 2016/0366853 A1    Dec. 22, 2016

(51) Int. Cl.
*H04W 4/02* (2018.01)
*A01K 11/00* (2006.01)
*H04W 4/80* (2018.01)

(52) U.S. Cl.
CPC .............. *A01K 11/008* (2013.01); *H04W 4/02* (2013.01); *H04W 4/80* (2018.02)

(58) Field of Classification Search
CPC .................................................. A01K 11/008
(Continued)

(56) References Cited

U.S. PATENT DOCUMENTS 5,576,972 A    11/1996  Harrison
5,872,516 A    2/1999   Bonge, Jr.
(Continued)

FOREIGN PATENT DOCUMENTS

CN    101112181 A    1/2008
WO    02060240 A3    2/2003
(Continued)

OTHER PUBLICATIONS

Form PCT/ISA/220, Notification of Transmittal of the International Search Report and the Written Opinion of the International Searching Authority, dated Oct. 23, 2015.
(Continued)

*Primary Examiner* — Qutbuddin Ghulamali
(74) *Attorney, Agent, or Firm* — Baker, Donelson, Bearman, Caldwell & Berkowitz, PC

(57) ABSTRACT

A system is described that includes communications modules, a wearable device, and an application running on a processor of a computing platform. The system includes placing each communications module at a location in a premise, wherein each communications module periodically transmits a unique number, wherein the application detects and stores each unique number. The system includes the application organizing linking information by linking each unique number with a distance and a function and transmitting the linking information to the wearable device. The wearable device may detect a transmission of a communications module, use information of the transmission to identify the communications module's unique number and to estimate a distance from the wearable device to its location. The wearable device may use the linking information to identify the corresponding function and distance and perform the function when the estimated distance meets at least one criterion with respect to the distance.

41 Claims, 8 Drawing Sheets

(58) Field of Classification Search
USPC .................. 340/573, 573.1, 573.2, 573.3
See application file for complete search history.

(56) References Cited

U.S. PATENT DOCUMENTS

| | | | |
|---|---|---|---|
| 6,204,762 | B1 | 3/2001 | Dering et al. |
| 6,415,742 | B1 | 7/2002 | Lee et al. |
| 6,431,121 | B1 | 8/2002 | Mainini et al. |
| 6,921,089 | B2 | 7/2005 | Groh et al. |
| 6,937,647 | B1 | 8/2005 | Boyd et al. |
| 7,275,502 | B2 | 7/2007 | Boyd et al. |
| 7,503,285 | B2 | 3/2009 | Mainini et al. |
| 7,583,931 | B2 | 9/2009 | Eu |
| 7,656,291 | B2 | 2/2010 | Rochelle et al. |
| 7,667,599 | B2 | 2/2010 | Mainini et al. |
| 7,841,301 | B2 | 11/2010 | Mainini et al. |
| 7,918,190 | B2 | 4/2011 | Belcher et al. |
| 7,946,252 | B2 | 5/2011 | Lee, IV et al. |
| 8,011,327 | B2 | 9/2011 | Mainini et al. |
| 8,049,630 | B2 | 11/2011 | Chao Cheng et al. |
| 8,069,823 | B2 | 12/2011 | Mainini et al. |
| 8,185,345 | B2 | 5/2012 | Mainini |
| 8,436,735 | B2 | 5/2013 | Mainini |
| 8,447,510 | B2 | 5/2013 | Fitzpatrick et al. |
| 8,451,130 | B2 | 5/2013 | Mainini |
| 8,483,262 | B2 | 7/2013 | Mainini et al. |
| 8,854,215 | B1 | 10/2014 | Ellis |
| 8,866,605 | B2 | 10/2014 | Gibson |
| 8,917,172 | B2 | 12/2014 | Charych |
| 8,947,240 | B2 | 2/2015 | Mainini |
| 9,035,773 | B2 | 5/2015 | Petersen et al. |
| 9,125,380 | B2 | 9/2015 | Deutsch |
| 9,131,660 | B2 | 9/2015 | Womble |
| 9,186,091 | B2 | 11/2015 | Mainini et al. |
| 9,307,745 | B2 | 4/2016 | Mainini |
| 2002/0010390 | A1 | 1/2002 | Guice et al. |
| 2002/0015094 | A1 | 2/2002 | Kuwano et al. |
| 2002/0036569 | A1 | 3/2002 | Martin |
| 2002/0092481 | A1 | 7/2002 | Spooner |
| 2002/0196151 | A1 | 12/2002 | Troxler |
| 2003/0035051 | A1 | 2/2003 | Cho et al. |
| 2003/0116099 | A1 | 6/2003 | Kim et al. |
| 2003/0169207 | A1 | 9/2003 | Beigel et al. |
| 2003/0179140 | A1 | 9/2003 | Patterson et al. |
| 2003/0218539 | A1 | 11/2003 | Hight |
| 2004/0108939 | A1 | 6/2004 | Giunta |
| 2004/0162875 | A1 | 8/2004 | Brown |
| 2005/0000469 | A1 | 1/2005 | Giunta et al. |
| 2005/0007251 | A1 | 1/2005 | Crabtree et al. |
| 2005/0020279 | A1 | 1/2005 | Markhovsky et al. |
| 2005/0035865 | A1 | 2/2005 | Brennan et al. |
| 2005/0059909 | A1 | 3/2005 | Burgess |
| 2005/0066912 | A1 | 3/2005 | Korbitz et al. |
| 2005/0081797 | A1 | 4/2005 | Laitinen et al. |
| 2005/0145196 | A1 | 7/2005 | Crist et al. |
| 2005/0145200 | A1 | 7/2005 | Napolez et al. |
| 2005/0172912 | A1 | 8/2005 | Crist et al. |
| 2005/0217606 | A1 | 10/2005 | Lee et al. |
| 2005/0235924 | A1 | 10/2005 | Lee et al. |
| 2005/0263106 | A1 | 12/2005 | Steinbacher |
| 2005/0280546 | A1 | 12/2005 | Ganley et al. |
| 2005/0288007 | A1 | 12/2005 | Benco et al. |
| 2006/0011145 | A1 | 1/2006 | Kates |
| 2006/0027185 | A1 | 2/2006 | Troxler et al. |
| 2006/0102101 | A1 | 5/2006 | Kim |
| 2006/0112901 | A1 | 6/2006 | Gomez |
| 2006/0191491 | A1 | 8/2006 | Nottingham et al. |
| 2006/0196445 | A1 | 9/2006 | Kates |
| 2007/0011339 | A1 | 1/2007 | Brown |
| 2007/0103296 | A1 | 5/2007 | Paessel et al. |
| 2007/0204803 | A1 | 9/2007 | Ramsay |
| 2007/0204804 | A1 | 9/2007 | Swanson et al. |
| 2007/0249470 | A1 | 10/2007 | Niva et al. |
| 2007/0266959 | A1 | 11/2007 | Brooks |
| 2008/0004539 | A1 | 1/2008 | Ross |
| 2008/0036610 | A1 | 2/2008 | Hokuf et al. |
| 2008/0055154 | A1 | 3/2008 | Martucci et al. |
| 2008/0055155 | A1 | 3/2008 | Hensley et al. |
| 2008/0058670 | A1 | 3/2008 | Mainini |
| 2008/0061978 | A1 | 3/2008 | Huang |
| 2008/0061990 | A1 | 3/2008 | Milnes et al. |
| 2008/0119757 | A1 | 5/2008 | Winter |
| 2008/0129457 | A1 | 6/2008 | Ritter et al. |
| 2008/0141949 | A1 | 6/2008 | Taylor |
| 2008/0143516 | A1 | 6/2008 | Mock et al. |
| 2008/0156277 | A1 | 7/2008 | Mainini et al. |
| 2008/0163827 | A1 | 7/2008 | Goetzl |
| 2008/0186167 | A1 | 8/2008 | Ramachandra |
| 2008/0186197 | A1 | 8/2008 | Rochelle et al. |
| 2008/0236514 | A1 | 10/2008 | Johnson et al. |
| 2008/0252527 | A1 | 10/2008 | Garcia |
| 2008/0272908 | A1 | 11/2008 | Boyd |
| 2009/0000566 | A1 | 1/2009 | Kim |
| 2009/0002188 | A1 | 1/2009 | Greenberg |
| 2009/0020002 | A1 | 1/2009 | Williams et al. |
| 2009/0025651 | A1 | 1/2009 | Lalor |
| 2009/0102668 | A1 | 4/2009 | Thompson et al. |
| 2009/0224909 | A1 | 9/2009 | Derrick et al. |
| 2009/0289785 | A1 | 11/2009 | Leonard |
| 2009/0289844 | A1 | 11/2009 | Palsgrove et al. |
| 2010/0033339 | A1 | 2/2010 | Gurley et al. |
| 2013/0321159 | A1* | 12/2013 | Schofield ............ A01K 11/008 340/573.3 |
| 2014/0062695 | A1* | 3/2014 | Rosen .................... G08B 21/18 340/539.13 |
| 2014/0120943 | A1* | 5/2014 | Shima .................... G01S 19/14 455/456.1 |
| 2015/0107531 | A1* | 4/2015 | Golden ................ A01K 11/008 119/719 |
| 2015/0199490 | A1* | 7/2015 | Iancu .................. G06F 19/3481 705/2 |

FOREIGN PATENT DOCUMENTS

| | | |
|---|---|---|
| WO | 2008085812 A2 | 7/2008 |
| WO | 2008140992 A1 | 11/2008 |
| WO | 2009105243 A2 | 8/2009 |
| WO | 2009106896 A2 | 9/2009 |
| WO | 2011055004 A1 | 5/2011 |
| WO | 2011136816 A1 | 11/2011 |
| WO | 2012122607 A1 | 9/2012 |
| WO | 2015015047 A1 | 2/2015 |

OTHER PUBLICATIONS

Form PCT/ISA/210, International Search Report, dated Oct. 23, 2015.
Form PCT/ISA/237, Written Opinion of the International Searching Authority, dated Oct. 23, 2015.

* cited by examiner

SYSTEMS AND METHODS FOR MONITORING A SUBJECT IN A PREMISE

CROSS REFERENCE TO RELATED APPLICATIONS

Not applicable.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

BACKGROUND OF THE INVENTION

This section is intended to introduce various aspects of the art, which may be associated with exemplary embodiments of the present disclosure. This discussion is believed to assist in providing a framework to facilitate a better understanding of particular aspects of the present disclosure. Accordingly, it should be understood that this section should be read in this light, and not necessarily as admissions of prior art.

As a result of work, school, and other obligations, most pet owners cannot be with their pet at every moment of every day. However, some pets, due to various conditions, behaviors, and circumstances, require some form of monitoring throughout each day or at least at particular times. This is particularly true if an owner allows a pet to freely roam a home premise in the owner's absence. There is a need to provide systems, methods and devices that track the location of a pet in a premise and that monitor and guide its behavior in such premise.

BRIEF DESCRIPTION OF THE DRAWINGS

So that the manner in which the present application can be better understood, certain illustrations and figures are appended hereto. It is to be noted, however, that the drawings illustrate only selected embodiments and elements of the systems and methods described herein and are therefore not to be considered limiting in scope for the systems and methods as described herein may admit to other equally effective embodiments and applications.

DETAILED DESCRIPTION

Figure 1:
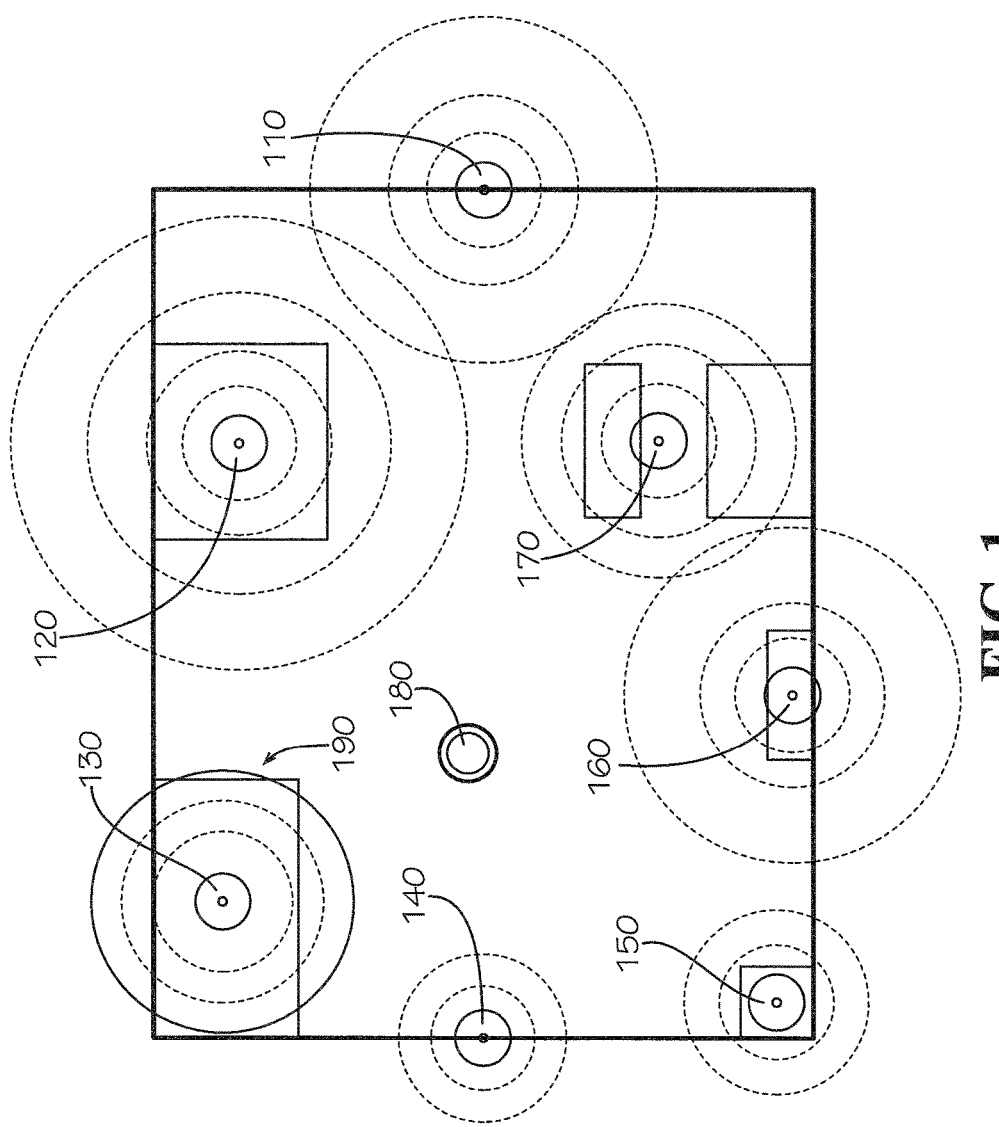
FIG. 1 shows beacons deployed at various locations in a home premise, under an embodiment.

The demographics of pet ownership have been changing. The size of pet dogs has been getting smaller, they stay inside the home longer per day; if not all day. Both young and older individuals are gravitating towards smaller dwellings. Metropolitan living is becoming more popular. As a result, apartments and condominiums in cities and municipalities are easing their restrictions related to dog occupancy in these smaller living spaces. Therefore, a market is being defined based on the needs for these (but not limited) to metropolitan pet owners.

Specifically looking at the needs of this demographic group, some of the more "rural" pet solutions do not apply. Coupled with the new technology platforms available and the prevalence of smart phones and internet availability, new solutions emerge. And in response to the general cry of consumers for products with more features and benefits with less complexity and "hassle", the systems and methods described herein answer that call.

Consider the reduced size of the pet's home in the metropolitan environment. The pet owners would like control of the pet's allowable whereabouts (stay out of the kitchen, ok in living room etc.), and knowledge of its routine activities (when did she sleep and where?, did she bark?, did she eat, drink and when? etc.). This disclosure provides for the simple set up of a monitoring/tracking/detection/training/avoidance system, easy configuration of system components, and optionally worldwide, real-time access to the information.

The systems and methods described herein include distributing pet beacons in a house at strategic locations to provide monitoring/tracking/detecting/training/avoidance functionality for pets. These devices are designed to periodically transmit a unique identification code along with functional parameters. Currently, such devices transmit signals for a distance of up to 70 meters. They are designed to be either battery or line powered, are small and easily located anywhere in the home. The individual beacons do not have an assigned function under one embodiment. This allows for simple activation and placement. Under one embodiment, beacons send unique identification and health status only (i.e. battery life). Under alternative embodiments, beacons may also transmit minimum and maximum signal strength values and other functional parameters.

The systems and methods described herein include providing pet collar devices. Under an embodiment a pet wears a collar that is designed to receive beacon transmissions, and act upon and/or store the data transmissions. Pet collar devices may also transmit beacon configuration data and summarized collected data from all monitored beacons to one or more smartphone receivers. The collar is also capable of providing positive and negative reinforcement as necessary utilizing a number of different stimulation techniques.

Under one embodiment, beacons comprise Bluetooth® Low Energy beacons. Under alternative embodiments, beacons comprise Bluetooth Low Energy peripherals capable of RF connection. Further, collars may comprise Bluetooth low energy enabled devices that function in a manner analogous to beacons. Bluetooth low energy (BLE) is itself a wireless technology standard for personal area networks. BLE is targeted for very low power devices, i.e. devices that can run on a coin cell battery for months or years. Under an embodiment, Bluetooth enabled beacons/devices may comprise Bluetooth integrated circuit implementations. Updates to embedded code of a Bluetooth enabled device may be accomplished through firmware over the air upgrades. Mobile device operating systems may natively support the Bluetooth low energy wireless communications protocol. Such operating systems include iOS, Android, Windows Phone and BlackBerry, as well as OS X, Linux, and Windows 8.

A smartphone application is described herein that is used to set up, and configure the in-home detection/monitoring system and configure its components. The smartphone application may also be used to monitor and control beacons and/or collar devices and upload monitored data. As one example, the smart phone application, when in range of either a beacon or a collar device may receive data from such devices, collect the data and/or store the data. The smart phone application may also cause action by a device such as the collar or any beacon, manually or automatically. As further described below, the application may wirelessly signal the collar device to apply a corrective action, i.e. apply a stimulus to the corresponding pet. When configuring the system, the application may provide a simple user interface for configuring the system, its components and their functionality.

It should be noted that beacons, the pet collar device(s) and mobile devices may both transmit and receive data. Accordingly, each such component/device may serve a dual function of transmitting and receiving/collecting data as further described below. In the examples provided below, beacons and pet collar devices are Bluetooth enabled but embodiments are not so limited. Further in the examples provided below an operating system of a mobile device (running a smartphone application of the system described herein) natively supports Bluetooth communications. Such operating system also natively supports any other communications protocols as they become available.

Assume that a user implements the tracking/monitoring system within a one bedroom apartment premise/home. Under such embodiment, FIG. 1 shows a home premise featuring a plurality of beacons 110-170 distributed by owner/user throughout the premise. FIG. 1 shows a beacon 120 placed in a bathroom of the home. FIG. 1 shows a beacon 130 placed in a bedroom of the home. FIG. 1 shows a beacon 110 placed at a front door of the home. FIG. 1 shows a beacon 140 placed at a living room window of the home. A beacon 170 may also be placed in a kitchen of the home. It is of course possible to place a beacon just about anywhere in, or around, the premise including in proximity to the pet's bed (beacon 160), food/water bowl (beacon 150) or other locations that may require monitoring, e.g. pet doors, furniture, outlets, etc. The dotted circles indicate the RF energy emitted from each beacon. A solid circle 190 indicates a range or threshold distance from each beacon configured be an "action" or "threshold" distance as further described below.

Figure 2:
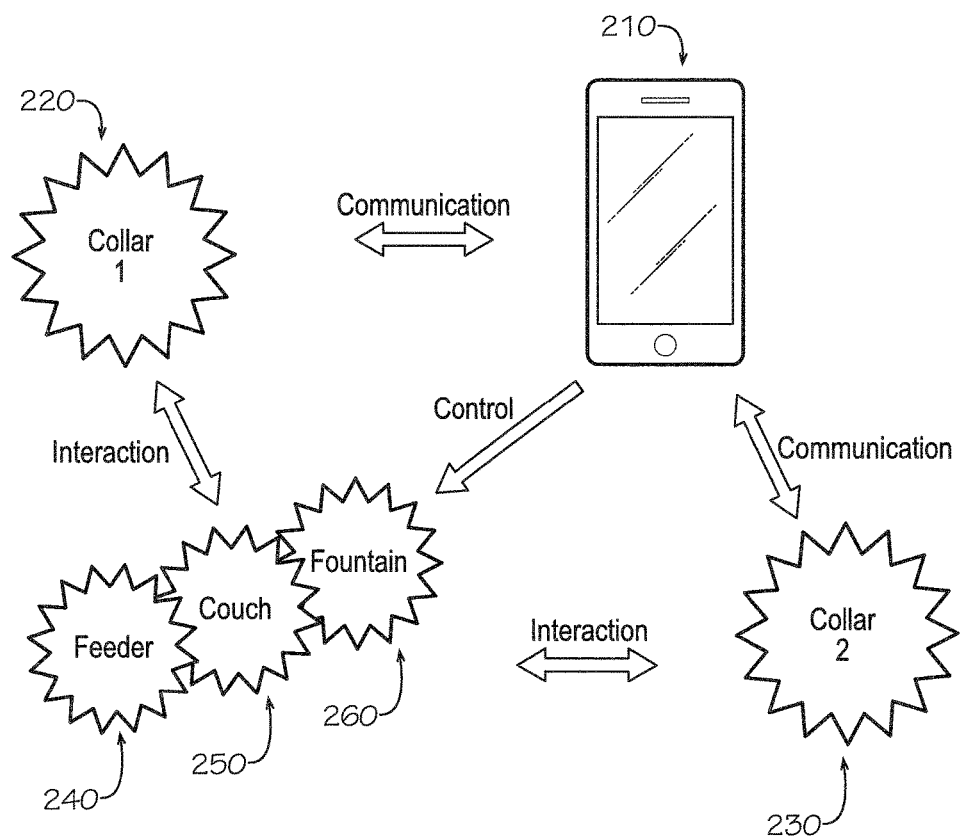
FIG. 2 shows the components of a monitoring system, under an embodiment.

FIG. 2 shows the components of a monitoring/tracking/detection system under an embodiment. FIG. 2 shows mobile device 210 running a smartphone application. The smartphone application is communicatively coupled to collar devices 220, 230. The smartphone application may transmit data to and control certain functions of the collar devices 220, 230 as further described below. The smartphone application may also receive data from collar devices as further described below. FIG. 2 shows collar devices 220, 230 communicatively coupled to beacons 240, 250, 260. The collar devices receive data periodically transmitted by beacons 240, 250, 260 and otherwise communicate with beacons 240, 250, 260 as further described below. The smartphone application 210 may assign certain functionality directly to beacons 240, 250, 260 and otherwise communicates with beacons as further described below.

As seen in FIG. 1, the beacons are indicated by dots located in select areas in a one-bedroom apartment, for example. A Bluetooth enabled beacon may periodically transmit data including a unique identification number. A Bluetooth enabled device, e.g. the collar device described herein, may receive the periodically transmitted data, extract the identification number and estimate the transmission's signal strength (i.e. received signal strength indication or "RSSI"). The collar device may then use the signal strength to estimate a distance from collar device to the transmitting beacon. The collar may be further assisted with its ranging calculation by utilizing calibration data contained within the beacon message. Further, the collar device itself periodically transmits data including a unique identification number. Under one embodiment, the collar device cycles between "transmission" and "listening" modes. As one example the collar device may periodically transmit data during a "transmission" period and then simply receive incoming signals from in range beacons/devices during a "listening" period. The collar may shift between "transmission" and "listening" periods in five second intervals. Under one embodiment, beacons similarly shift between transmission and listening modes.

Figure 3:
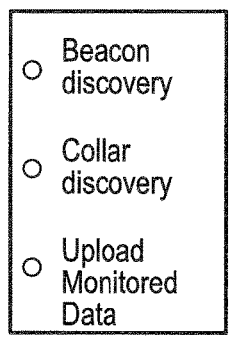
FIG. 3 shows an application interface providing discovery options, under an embodiment.

Under one embodiment, the smartphone application may provide an "easy to use" configuration interface. A pet owner may initiate the application on a smartphone and walk through a set up procedure using the configuration interface. For example, such interface of the application may provide click through buttons for "beacon" and "collar" discovery modes as seen in FIG. 3. The user may under this embodiment select "beacon" discovery mode. The interface may then prompt the user to bring the smartphone device in proximity to a transmitting beacon, i.e. within transmission range of a beacon. In beacon discovery mode, the application may use one or more mobile device operating system APIs to detect incoming Bluetooth transmissions. The application and mobile device detect the periodically transmitted beacon signal and identify/store its unique identification number. The mobile device may use strength of incoming signal to estimate a distance from the beacon. Under one embodiment, the application may only enable availability of discovery mode in close proximity to the transmitting beacon. The user may repeat this process for each and every beacon that the user wishes to deploy in the premise. In this manner, the application learns the identification number of each beacon deployed in the premise.

Continuing with this configuration example, a user runs the same application on the user's smart phone to configure the collar device for operation. As indicated above, an interface of the application may provide click through buttons for "beacon" and "collar" discovery modes as seen in FIG. 3. The user may under this embodiment select the "collar" discovery mode. The user brings the smartphone device in proximity to the pet collar device, i.e. within transmission range of the collar. In collar configuration mode, the application may use one or more mobile device operating system APIs to detect incoming Bluetooth transmissions originating from the collar device. The application and mobile device detect the periodically transmitted signals from the collar device and identify its unique identification number. The mobile device may use strength of incoming signal to estimate a distance from the collar device. Under one embodiment, the application may only enable availability of collar device discovery mode in close proximity to the collar device. The user may repeat this process for each and every collar device that the user wishes to deploy in the premise. In this manner, the application learns the identification number of each collar device deployed in the premise.

In this manner, the application may learn the unique identification number of all premise beacons and the pet collar devices. It should be noted that FIG. 3 provides a separate interface for discovery of beacons and collar devices. However, the discovery mode interface may be integrated into the workflow of beacon/collar configuration interfaces shown in FIGS. 4 and 6 and further described below. Note also that FIG. 3 provides Upload Monitor Data allowing the option to trigger upload of data collected by collar device to the smartphone.

A user may use the smartphone application to configure the collar (or collars) for operation, i.e. to configure "collar defined" functions or enable recognition of specific "tag defined" beacons. The collar itself performs a set of "active" and/or "passive" functions. Proximity to a beacon triggers one or more such functions as defined by the user with respect to the particular beacon. In other word, for each deployed beacon the user defines a collar implemented function triggered by the collar's entry into a defined proximity of a particular beacon.

Figure 4:
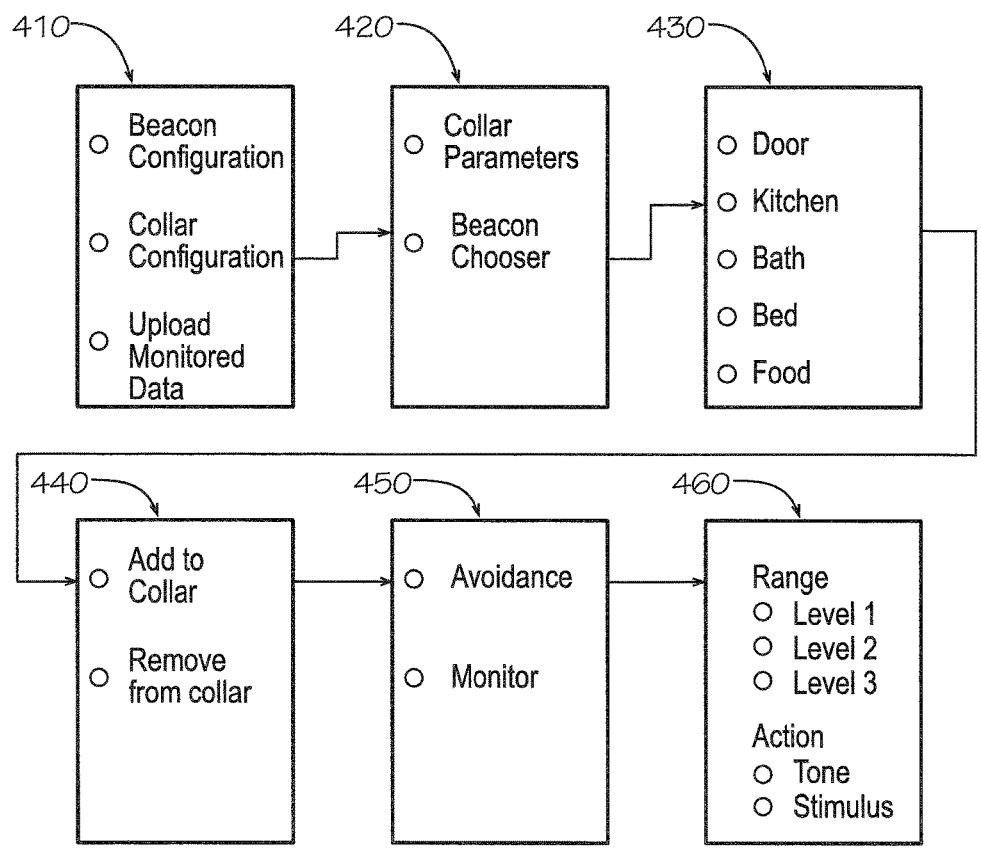
FIG. 4 shows an application interface providing configuration options, under an embodiment.

FIG. 4 shows an interface allowing a user to configure collar defined functions with respect to specific beacons. This system of this embodiment comprises a single collar and multiple beacons. Screen 410 shows a Beacon Configuration option (described below with respect to FIG. 6), a Collar Configuration option, and an Upload Monitor Data option. (The Upload Monitor Data Option of screen 410 provides the option to trigger upload of data collected by collar device to the smartphone). A user selects under one embodiment the Collar Configuration option and is presented with screen 420. At this screen 420 a user may select Collar Parameters or Beacon Chooser. The Collar Parameters option introduces an interface (not shown) for configuring functional parameters of the collar such as correction level. A user selects under an embodiment Beacon Chooser and proceeds to screen 430 which lists the beacons available within the system (e.g. door, kitchen, bath, bed, food). The user selects the kitchen beacon and is provided a choice at screen 440 between Add to Collar and Remove from Collar. The user may select Add to Collar to associate the kitchen beacon with the collar device. (The user may also select Remove from Collar to dissociate from the collar device a previously assigned beacon). After associating the kitchen beacon with the collar device, the user sees screen 450 featuring Avoidance and Monitor options. A user may assign the kitchen beacon an Avoidance function or a Monitor function. After selecting Avoidance, the user manipulates interface selections (at screen 460) to assign the collar a stimulus function when the collar is within a selected range (Level 1) of the beacon. Specifically the user selects a negative stimulus (applied by the collar) as an avoidance function and designates a corresponding range. The application interface may provide various stimulus functions (tone, stimulus, scent, etc.) and one or more ranges. Range Level 1 for example indicates close proximity to a beacon. Range Level 2 and Range Level 3 represent enlarged threshold distances. After selecting range and function, the user may be presented with another screen (not shown) allowing user to designate permitted access times, e.g. times during which the collar does not apply the designated function when the collar device in within the designated range. Embodiments are not limited to the functions and ranges described in FIG. 4. In this example, the user simply directs the collar to perform an avoidance function when the collar is within a near range threshold distance of the beacon. Once the configuration selections are complete for a collar/beacon combination, the application may prompt the user to bring the application in proximity to the collar device. The application may then transmit such configuration data to the pet collar device which uses the data to build/maintain a database which associates actions/functions with beacons (and corresponding unique identification numbers and permitted times). In this manner a user may assign functions to the collar with respect to each beacon within the system.

Figure 5:
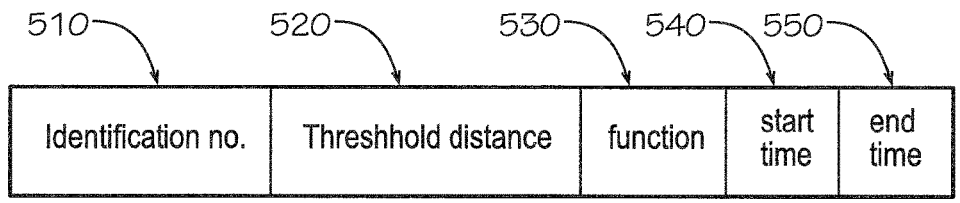
FIG. 5 shows a representative database entry of a database stored in a collar device, under an embodiment.

FIG. 5 shows a representative entry in a database which associates beacon identification number 510 with an avoidance function 530 and threshold distance 520. The representative database entry also includes start time 540/end time 550 of the configured function. Such database may associate values using a relational database scheme.

Continuing with this example, an operational pet collar device approaches the particular beacon and crosses over the configured threshold distance. During this event, the particular beacon simply transmits is unique identification number. The collar device receives the signal, identifies the unique identification number, and uses signal strength of the transmission to estimate a distance to the beacon. The collar device then uses the identification number to perform a database lookup to determine the assigned collar function with respect to the beacon (e.g., a negative stimulus) and conditions for its performance (e.g. location of the collar device within a certain threshold distance and permitted time of performance). In this example, the collar determines that the function is delivery of stimulus and also resolves that the estimated distance from collar to beacon is less than the selected threshold distance (via comparison of estimated distance with designated threshold distance). Therefore, the collar device delivers the avoidance stimulus to the pet wearing the collar device. It should be noted that threshold distance may comprise distance from a location or a range of such distances (including an upper and lower boundary).

In the example above, the assigned function comprises a user/collar defined function. In other words, a user may assign functions to collar/beacon combinations. For example, a user may wish to prevent a pet from jumping on the user's couch. Therefore, the user may assign a beacon located near the couch an avoidance function, i.e. assign an avoidance function to a collar with respect to such beacon. However, a user may simply wish to know how often a pet visits a water bowl in daytime hours while the user is away from the premise, i.e. the user may simply wish to track the location of a pet. Accordingly, a user may assign a beacon located near the water bowl a tracking function, i.e. assign a tracking function to a collar with respect to such beacon. The user then assigns the collar device the tracking function via the application in the same way the avoidance function is assigned (as described above). When the pet collar device is within a threshold distance of the beacon (and once the collar device processes conditions for performance of the assigned function based on beacon/function/distance/time parameters), the pet collar device simply logs location data, e.g. the occurrence of a threshold crossing, the time of a threshold crossing, duration of pet's proximity to a beacon, etc.). The tracking beacon may under an embodiment also administer a positive reinforcement such as a positive tone if so configured by the user.

The flexibility of the system is evident in view of a second pet collar device. Within the same monitored premise, the configuration process described above may be used to assign functions to a second collar device with respect to the same set of beacons. This set of functions may be entirely different than those assigned to the first collar. This is possible due to the fact that beacons merely transmit identification numbers while the collar devices detect/extract the identification numbers and then resolve/perform a user defined function based on configuration data stored in a collar specific database.

Figure 6:
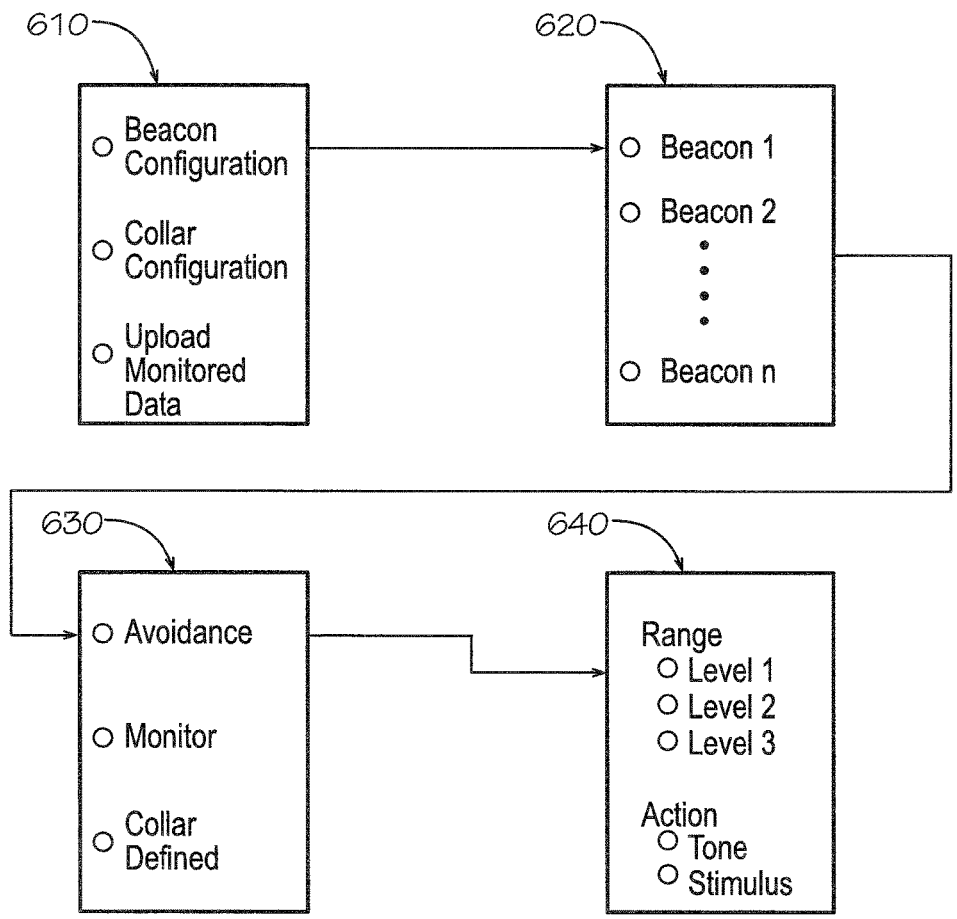
FIG. 6 shows an application interface providing configuration options, under an embodiment.

In contrast to "user defined" functions, a user may also dedicate a specific beacon to a particular task. For example, a user may use the application interface during setup to assign an avoidance function to a beacon directly. An example of directly configuring a beacon defined function using a smartphone application is provided below. A user initiates the smartphone application which under one embodiment provides an interface for assignment of functions directly to beacons. FIG. 6 shows a screen 610 featuring Beacon and Collar Configuration options as well as a Monitor Data option. For example, a user may select the Beacon Configuration option shown in FIG. 6. The interface may then present at the next screen 620 all discovered beacons, i.e. up to "n" number beacons discovered via the process described above and as seen in FIG. 6. (It should be understood that Beacons 1-n may be replaced by the names of the monitored locations, e.g. kitchen, door, window, etc.). A user then selects a particular beacon (e.g. beacon 2) and then views configuration options at screen 630 for the pet collar with respect to the selected beacon. Screen 630 shows Avoidance and Monitor options which represent options to assign an Avoidance or Monitor function to the beacon. (The Collar Defined option provides the option to designate a beacon as collar defined which means that the beacon's interaction with a collar device is governed by configuration data maintained by the collar device as described above with respect to FIG. 4). The user may under an embodiment designate an Avoidance function at screen 630. The user is then presented at screen 640 with range and action options as seen in FIG. 6. The user manipulates interface selections to assign the collar a stimulus function when the collar is within a selected range (Level 1) of the beacon. Specifically the user selects a negative stimulus (applied by the collar) as an avoidance function and designates a corresponding range. The application interface may provide various stimulus functions (tone, stimulus, scent, etc.) and one or more ranges. Range Level 1 for example indicates close proximity to a beacon. Range Level 2 and Range Level 3 represent enlarged threshold distances. After selecting range and function, the user may be presented with another screen (not shown) allowing user to designate permitted access times, e.g. times during which the collar does not apply the designated function when the collar device in within the designated range. Embodiments are not limited to the functions and ranges described in FIG. 6. Once the configuration selections are complete for a beacon, the application may prompt the user to bring the application in proximity to the beacon. The application may then transmit such configuration data (including function data, distance data, and permitted times data) to the beacon. The beacon encodes the particular configuration data into packets for inclusion in the beacon's periodic transmissions. Accordingly, the beacon periodically transmits both its identification number and the configuration data to devices within its range. In this manner a user may assign a function directly to each beacon within the system. Under an embodiment, the application also transmits the unique identification number of the particular configured beacon to the collar device. In this manner, the collar device may monitor incoming beacon transmissions and confirm that the beacon is part of the configured system under this embodiment.

As indicated above, a user may use the application interface during setup to assign an avoidance function to a beacon directly. During set up operations, the application transmits such configuration data to the specifically tasked beacon. (It should be noted beacons not only transmit data, they may also receive and store data from other beacons or devices). The transmitted data includes "function data" (which encodes the particular function in data packets for inclusion in the beacon's periodic transmissions), threshold distance (and permitted time data under an embodiment). The application may also send the beacon's identification number to the collar device which stores such information. Accordingly, the beacon periodically transmits its identification number, the function data, and a threshold distance (and permitted times under an embodiment) to devices within its range. Under this example, the pet collar device may approach the beacon transmitting the identification number and corresponding data. The collar device then extracts the identification number, the "function data", distance data (and permitted time data under an embodiment) and uses the signal strength of the transmission to estimate distance from the beacon. The collar device may match the identification number to stored beacon identification numbers to ensure that the particular beacon is part of the configured system, i.e., that the collar device should proceed. The collar device may then match "function data" with function type, e.g. avoidance, tracking, etc., using embedded code within a pet collar. Alternatively, a smartphone application may transmit such data to the collar device during set up operations. Under this example, the function data corresponds to an avoidance task, i.e. delivery of negative stimulus. The collar device then resolve whether the device is within the designated threshold distance (and within appropriate time interval under an embodiment). If so, the collar device executes the assigned function, i.e. delivers the negative stimulus.

Figure 7A:
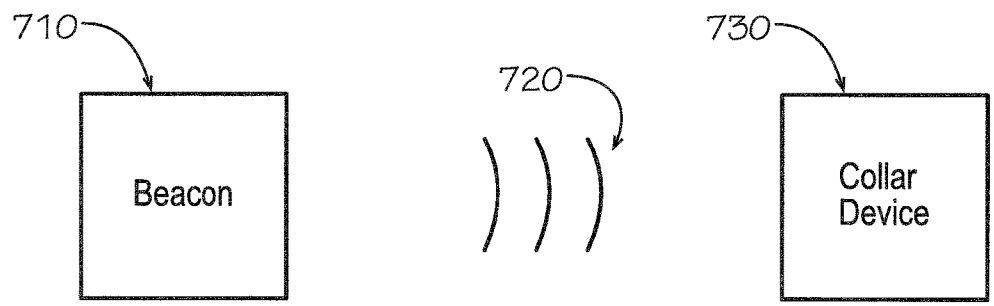
FIG. 7A shows a beacon defined interaction between beacon and collar device, under an embodiment.

FIG. 7A shows a beacon defined embodiment of beacon/device functionality. Under this embodiment, the beacon 710 transmits 720 its identification number, a distance range (e.g., nearby range) and function data. (It should be noted that distance range may comprise distance from a location or a range of such distances including an upper and lower boundary). The collar devices uses signal strength to estimate distance from the transmitting beacon. The collar device 730 extracts function data (corresponding to negative stimulus) and distance range information from the signal. The collar device interprets the function data as a negative stimulus function, and if the collar device determines that the collar device is within a near range distance, then the collar device applies the negative stimulus. The collar device may also log the time/duration of the event along with corresponding identification number of the beacon.

Figure 7B:
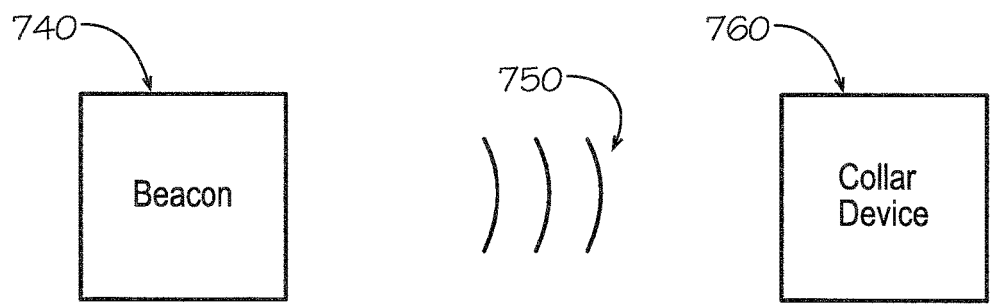
FIG. 7B shows a collar defined interaction between beacon and collar device, under an embodiment.

FIG. 7B shows a collar defined embodiment of beacon/device functionality. Under such embodiment, the beacon 740 (located near a couch) simply transmits 750 its unique identification number. The collar device 760 then detects the transmission, identifies the identification number and uses signal strength to estimate distance from the transmitting beacon. The collar device then uses the identification number to look up configuration data. Under this embodiment, such data comprises an avoidance function (i.e., negative stimulus), and a midrange distance. (It should be noted that distance range may comprise distance from a location or a range of such distances including an upper and lower boundary). If the collar device determines that the device is within a midrange distance, then the collar device applies the negative stimulus. The collar device may also log the time/duration of the event along with corresponding identification number of the beacon.

Figure 8A:
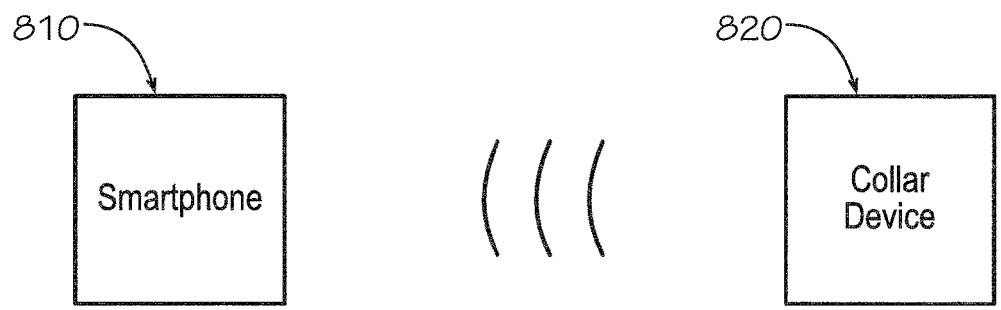
FIG. 8A shows a one way communication between smartphone and collar device, under an embodiment.
Figure 8B:
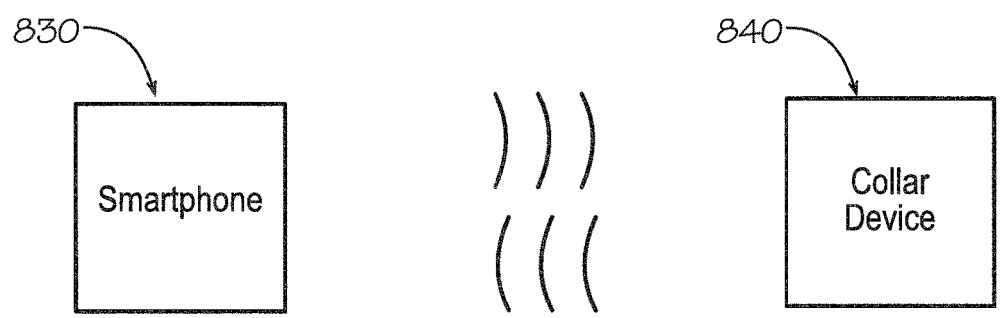
FIG. 8B shows two way communications between smartphone and collar device, under an embodiment.

FIG. 8A shows a collar device 820 transmitting data to a smartphone 810 under one embodiment. FIG. 8B shows two way communication between a collar device 840 and a smartphone 830 under one embodiment.

Under one embodiment, a home detection kit may ship with a collar and corresponding beacons. A user may first register the smart phone application with a company provided internet service. Registration may provide the application with the unique device identification numbers of the beacons and the collar(s). Alternatively, the application may discover identification numbers during configuration as described in detail above.

Under one embodiment, a pet owner/user deploys beacons in a home. The user simply locates beacons in areas of interest. The pet owner uses a collar, in conjunction with a smartphone application to assign "Avoid" and/or "Track" functions to collar/beacon combinations. As an example of assigning an "Avoid" function (using the procedures already described in detail above), a user first places a red sticker on a beacon. The user then approaches the beacon with a mobile device running the smartphone application. The application/device reads the unique identification of the beacon and reads receiver signal strength indication (RSSI) value. The application then communicates with the collar to assign collar a function of the particular beacon when the pet collar is within a set range of the beacon. If the pet collar comes within a configured distance of the particular beacon, the collar triggers a negative stimulus and stores the time of the event under an embodiment.

As an example of assigning a "Track" function (using the procedures already described in detail above), a user first places a green sticker on beacon. The user then approaches the beacon with a mobile device running the smartphone application. The application/device reads the unique identification of the beacon and reads receiver signal strength indication (RSSI) value. The application then communicates with the collar to assign collar a function of the particular beacon when the pet collar is within a set range of the beacon. If the pet collar comes within a configured distance of the particular beacon, the collar will log the occurrence of the event and/or emit a positive reinforcement stimulus under an embodiment. The collar may also store the time of the event.

As the pet wearing the collar moves about the home, the collar collects data while controlling the pet's whereabouts through stimulus events triggered by proximity to "red" beacons and tracked events triggered by proximity to "green" beacons. When the collar is within range of the smart phone application, the collar transmits all collected/queued data to the application which may then display such information. A user may also deliver immediate Avoid/Track commands to the collar.

Figure 9:
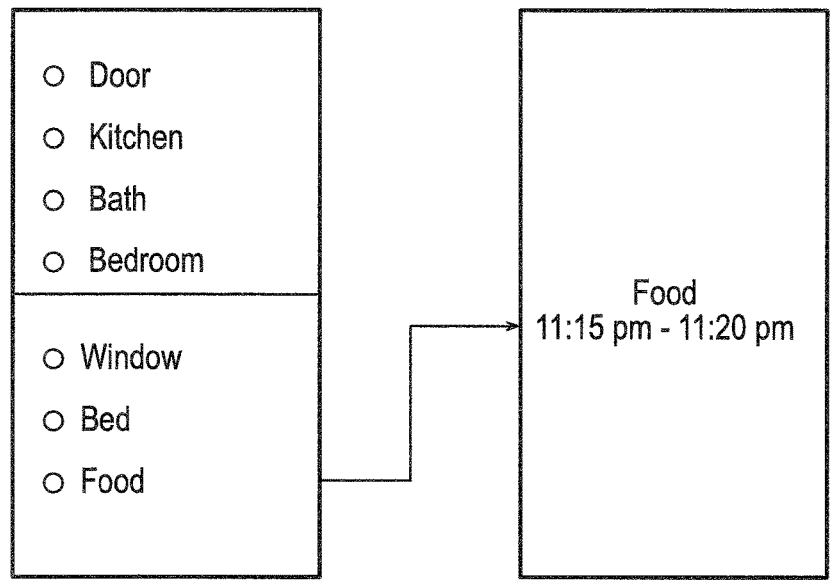
FIG. 9 shows an application interface providing user a selection among multiple beacons, under an embodiment.

FIG. 9 shows an application interface allowing user a selection among beacon locations. A user may select "Food" which then directs user to another page featuring tracking data. In this example (as seen in FIG. 9), the interface shows that the user's pet was within a configured range of the pet's water bowl from 11:15-11:20 pm.

Figure 10:
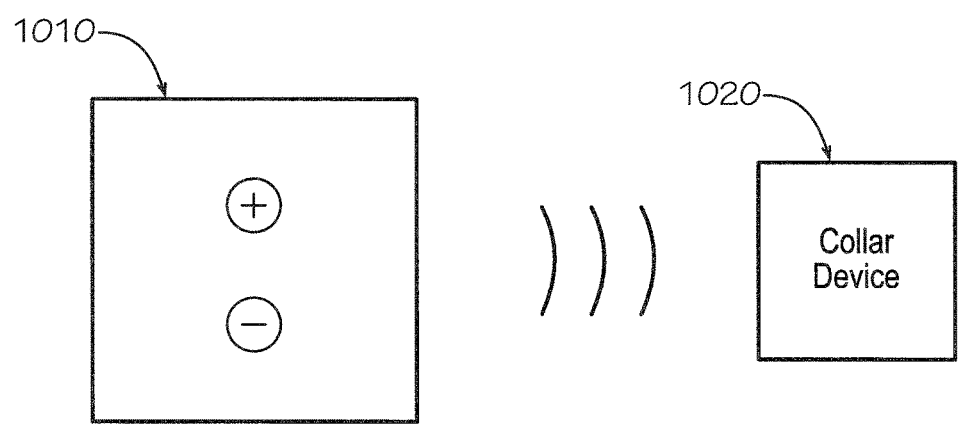
FIG. 10 shows a remote training application interface, under an embodiment.

FIG. 10 shows a "Remote Trainer" interface page of an application running on a smartphone 1010. A user may select the "+" button to direct the collar 1020 to administer a positive stimulus. A user may select the "−" button to direct the collar 1020 to administer a negative stimulus.

Under one embodiment, Bluetooth LE modules are used in the beacons and collars of the systems and methods described above. Alternatively, unique RF beacons may be specially designed for this detection/tracking/monitoring system described herein.

Under one embodiment, one or more of a pet collar device, a beacon, and smartphone may be communicatively coupled via Wi-Fi connection to a local router, LAN or local personal area network to provide a communicative coupling with wide area networks, metropolitan area networks and with the internet in general. Each such device therefore is communicatively coupled to a remote cloud computing platform comprising one or more applications running on at least one processor of a remote server. Accordingly, the collar/beacons/smartphone may transmit data to and/or receive data from a cloud computing platform.

Under one embodiments, beacons may comprise a green and red side. If placed with green side up, the beacon may be automatically configured as a "Track" location. If placed with red side up, the beacon may be automatically configured as an "Avoid" location.

It is understood that the systems and method described herein are merely illustrative. Other arrangements may be employed in accordance the embodiments set forth below. Further, variations of the systems and method described herein may comply with the spirit of the embodiments set forth herein.

Figure 11:
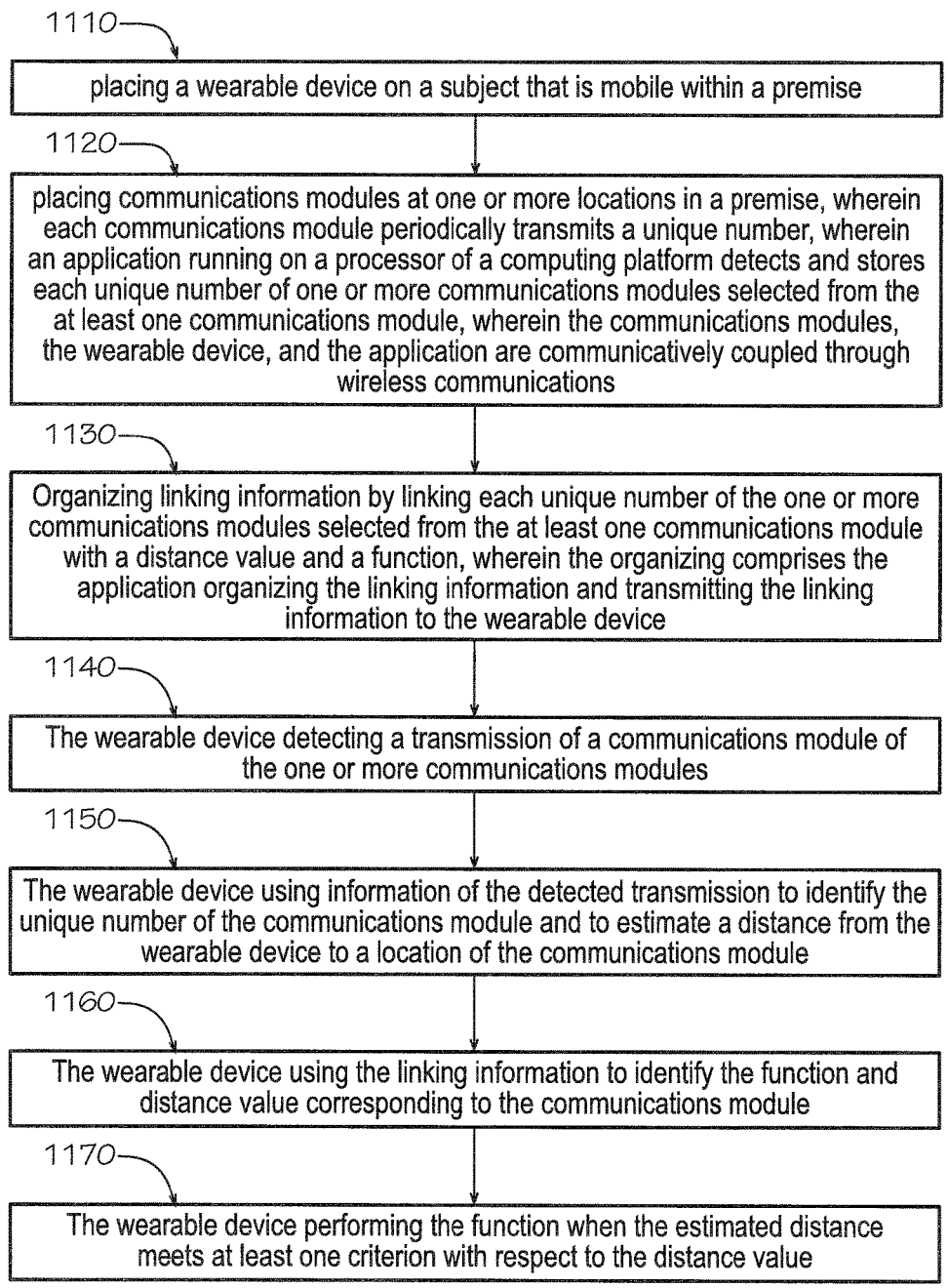
FIG. 11 shows a method of monitoring a subject in a premise, under an embodiment.

FIG. 11 comprises a method monitoring a subject in a premise, under an embodiment. Step 1110 includes placing a wearable device on a subject that is mobile within a premise. Step 1120 includes placing communications modules at one or more locations in a premise, wherein each communications module periodically transmits a unique number, wherein an application running on a processor of a computing platform detects and stores each unique number of one or more communications modules selected from the at least one communications module, wherein the communications modules, the wearable device, and the application are communicatively coupled through wireless communications. Step 1130 includes organizing linking information by linking each unique number of the one or more communications modules selected from the at least one communications module with a distance value and a function, wherein the organizing comprises the application organizing the linking information and transmitting the linking information to the wearable device. Step 1140 includes the wearable device detecting a transmission of a communications module of the one or more communications modules. Step 1150 includes the wearable device using information of the detected transmission to identify the unique number of the communications module and to estimate a distance from the wearable device to a location of the communications module. Step 1160 includes the wearable device using the linking information to identify the function and distance value corresponding to the communications module. Step 1170 includes the wearable device performing the function when the estimated distance meets at least one criterion with respect to the distance value.

A system is describe herein that comprises under one embodiment at least one communications module, a wearable device, and an application running on a processor of a computing platform, wherein the at least one communications module, the wearable device and the application are communicatively coupled through wireless communications. The system includes placing each communications module at a location in a premise, wherein each communications module periodically transmits a unique number, wherein the application detects each unique number of one or more communications modules selected from the at least one communications module. The system includes the application organizing linking information, the organizing linking information comprising linking each unique number of the one or more communications modules with a distance value and a function, wherein the application transmits the linking information to the wearable device. The system includes the wearable device detecting a transmission of a communications module of the one or more communications modules, the wearable device using information of the detected transmission to identify the unique number of the communications module and to estimate a distance from the wearable device to the location of the communications module, the wearable device using the linking information to identify the corresponding function and distance value, the wearable device performing the function when the estimated distance meets at least one criterion with respect to the distance value.

The wearable device under an embodiment stores the linking information in a database.

The wearable device using the linking information comprising a database lookup under an embodiment.

The application detecting each unique number includes storing each unique number under an embodiment.

The at least one criterion comprises the estimated distance being less than the distance value under an embodiment.

The at least one criterion comprises the estimated distance being greater than the distance value under an embodiment.

The at least one criterion comprises the estimated distance being between a range of distance values under an embodiment.

The wearable device comprises a collar under an embodiment.

The animal under an embodiment wears the collar.

The computing platform under an embodiment comprises one or more of a smartphone, tablet, desktop computer, laptop computer and mobile computing device.

The performed function comprises under an embodiment logging information of the performed function.

The logged information under an embodiment includes one or more of a time, an occurrence, and a duration of the performed function.

The logging the information under an embodiment comprises associating the time and the occurrence with the unique number of the communications module.

The wearable device transmits the logged information to the application under an embodiment.

The application provides access to the logged information through an electronic interface under an embodiment.

The performed function comprises an avoidance function, wherein the avoidance function comprises applying a negative stimulus to a user of the wearable device under an embodiment.

The performed function comprises a tracking function under an embodiment, wherein the tracking function comprises applying a positive stimulus to a user of the wearable device.

The linking each unique number comprising under an embodiment linking each unique number with a permitted time, the wearable device using the linking information to identify the corresponding permitted time, the wearable device performing the function when a time of the performing comprises the permitted time.

The linking each unique number under an embodiment comprising linking a first unique number with a first distance value, a first function and a first permitted time.

The linking each unique number comprising under an embodiment linking a second unique number with a second distance value, a second function, and a second permitted time.

The first distance value is different than the second distance under an embodiment.

The first function is different than the second function under an embodiment.

The first permitted time is different than the second permitted time under an embodiment.

The application organizing linking information comprises under an embodiment organizing first linking information for a first wearable device, wherein the first linking information includes the linking information and the first wearable device includes the wearable device.

The application organizing linking information comprises under an embodiment organizing second linking information for a second wearable device.

The first linking information is different than the second linking information under an embodiment.

The wireless communications comprises under an embodiment a Bluetooth low energy communications protocol.

The at least one communications module comprises a Bluetooth enabled device under an embodiment.

The wearable device comprises a Bluetooth enabled beacon under an embodiment.

The application provides an electronic interface under an embodiment.

The application detecting each unique number of one or more communications modules selected from the at least one communications module comprises under an embodiment selecting the one or more communications modules using the electronic interface.

The organizing linking information includes under an embodiment using the electronic interface to link each unique number with a distance value and a function.

The one or more of the wearable device, the at least one communications module, and the computing platform are under an embodiment communicatively coupled via Wi-Fi connection to a local router, local area network or local personal area network.

The coupling provides internet connectivity under an embodiment.

The one or more of the wearable device, the at least one communications module, and the computing platform is under an embodiment communicatively coupled with a cloud computing platform comprising one or more applications running on at least one processor of a remote server.

The one or more of the wearable device, the at least one communications module, and the computing platform under an embodiment at least one of transmit data to and receive data from the computing platform.

A system under one embodiment is described herein that includes at least one communications module, a wearable device, and an application running on a processor of a computing platform, wherein the at least one communications module, the wearable device and the application are communicatively coupled through wireless communications, wherein each communications module of the at least one communications module corresponds to a unique number. The system includes placing one or more communications modules of the at least one communications module at a location in a premise, wherein the application transmits to the wearable device identification information, the identification information comprising a corresponding unique number for each communications module of the one or more communications modules, wherein the wearable device stores the identification information. The system includes the application transmitting data to the one or more communications modules, the transmitting the data comprising transmitting a corresponding function and distance value for each communications module of the one or more communications modules. The system includes a communications module of the one or more communications modules periodically transmitting a corresponding unique number, a corresponding function and a corresponding distance value. The system includes the wearable device detecting a transmission of the communications module, the wearable device using information of the detected transmission to identify the unique number of the communications module, the transmitted function, and the transmitted distance value and to estimate a distance from the wearable device to the location of the communications module. The system includes the wearable device locating a presence of the unique number in the stored identification information, wherein upon the locating, the wearable device compares the transmitted distance value with the estimated distance and performs the transmitted function when the estimated distance meets at least one criterion with respect to the transmitted distance value.

The at least one criterion under an embodiment comprises the estimated distance being less than the transmitted distance value.

The at least one criterion under an embodiment comprises the estimated distance being greater than the transmitted distance value.

The at least one criterion under an embodiment comprises the estimated distance being between a range of transmitted distance values.

The performed function under an embodiment comprises logging information of the performed function, wherein the logged information includes a time and an occurrence of the performed function.

The logging the information under an embodiment comprises associating the time and the occurrence with the unique number of the communications module.

The performed function comprises under an embodiment an avoidance function, wherein the avoidance function comprises applying a negative stimulus to a user of the wearable device.

The performed function under an embodiment comprises a tracking function, wherein the tracking function comprises applying a positive stimulus to a user of the wearable device.

A method is described herein that under one embodiment comprises placing a wearable device on a subject that is mobile within a premise. The method includes placing communications modules at one or more locations in the premise, wherein each communications module periodically transmits a unique number, wherein an application running on a processor of a computing platform detects and stores each unique number of one or more communications modules selected from the at least one communications module, wherein the communications modules, the wearable device, and the application are communicatively coupled through wireless communications. The method includes organizing linking information by linking each unique number of the one or more communications modules selected from the at least one communications module with a distance value and a function, wherein the organizing comprises the application organizing the linking information and transmitting the linking information to the wearable device. The method includes the wearable device detecting a transmission of a communications module of the one or more communications modules. The method includes the wearable device using information of the detected transmission to identify the unique number of the communications module and to estimate a distance from the wearable device to a location of the communications module. The method includes the wearable device using the linking information to identify the function and distance value corresponding to the communications module. The method includes the wearable device performing the function when the estimated distance meets at least one criterion with respect to the distance value.

The at least one criterion comprises under an embodiment the estimated distance being less than the distance value.

The at least one criterion comprises under an embodiment the estimated distance being greater than the distance value.

The at least one criterion comprises under an embodiment the estimated distance being between a range of distance values.

A method is described herein that under one embodiment comprises placing a wearable device on a subject that is mobile within a premise. The method includes placing one or more communications modules at a location in the premise. The method includes one or more applications running on at least one processor of a computing platform transmitting identification information to the wearable device, wherein the one or more communications modules, the wearable device and the one or more applications are communicatively coupled through wireless communications, the identification information comprising a corresponding unique number for each communications module of the one or more communications modules, wherein the wearable device stores the identification information. The method includes the one or more applications transmitting data to a communications module of the one or more communications modules, wherein the data comprises a function and a distance value. The method includes the communications module periodically transmitting a unique number, the function and the distance value. The method includes the wearable device detecting a transmission of the communications module, the wearable device using information of the detected transmission to identify the unique number of the communications module, the transmitted function, and the transmitted distance value, and to estimate a distance from the wearable device to the location of the communications module. The method includes the wearable device locating a presence of the unique number in the stored identification information, wherein upon the locating, the wearable device compares the transmitted distance value with the estimated distance and performs the transmitted function when the estimated distance meets at least one criterion with respect to the distance value.

Computer networks suitable for use with the embodiments described herein include local area networks (LAN), wide area networks (WAN), Internet, or other connection services and network variations such as the world wide web, the public internet, a private internet, a private computer network, a public network, a mobile network, a cellular network, a value-added network, and the like. Computing devices coupled or connected to the network may be any microprocessor controlled device that permits access to the network, including terminal devices, such as personal computers, workstations, servers, mini computers, main-frame computers, laptop computers, mobile computers, palm top computers, hand held computers, mobile phones, TV set-top boxes, or combinations thereof. The computer network may include one of more LANs, WANs, Internets, and computers. The computers may serve as servers, clients, or a combination thereof.

The systems and methods of monitoring a subject in a premise can be a component of a single system, multiple systems, and/or geographically separate systems. The systems and methods of monitoring a subject in a premise can also be a subcomponent or subsystem of a single system, multiple systems, and/or geographically separate systems. The components of the systems and methods of monitoring a subject in a premise can be coupled to one or more other components (not shown) of a host system or a system coupled to the host system.

One or more components of the systems and methods of monitoring a subject in a premise and/or a corresponding interface, system or application to which the systems and methods of monitoring a subject in a premise are coupled or connected includes and/or runs under and/or in association with a processing system. The processing system includes any collection of processor-based devices or computing devices operating together, or components of processing systems or devices, as is known in the art. For example, the processing system can include one or more of a portable computer, portable communication device operating in a communication network, and/or a network server. The portable computer can be any of a number and/or combination of devices selected from among personal computers, personal digital assistants, portable computing devices, and portable communication devices, but is not so limited. The processing system can include components within a larger computer system.

The processing system of an embodiment includes at least one processor and at least one memory device or subsystem. The processing system can also include or be coupled to at least one database. The term "processor" as generally used herein refers to any logic processing unit, such as one or more central processing units (CPUs), digital signal processors (DSPs), application-specific integrated circuits (ASIC), etc. The processor and memory can be monolithically integrated onto a single chip, distributed among a number of chips or components, and/or provided by some combination of algorithms. The methods described herein can be implemented in one or more of software algorithm(s), programs, firmware, hardware, components, circuitry, in any combination.

The components of any system that include the systems and methods of monitoring a subject in a premise can be located together or in separate locations. Communication paths couple the components and include any medium for communicating or transferring files among the components. The communication paths include wireless connections, wired connections, and hybrid wireless/wired connections. The communication paths also include couplings or connections to networks including local area networks (LANs), metropolitan area networks (MANs), wide area networks (WANs), proprietary networks, interoffice or backend networks, and the Internet. Furthermore, the communication paths include removable fixed mediums like floppy disks, hard disk drives, and CD-ROM disks, as well as flash RAM, Universal Serial Bus (USB) connections, RS-232 connections, telephone lines, buses, and electronic mail messages.

Aspects of the systems and methods of monitoring a subject in a premise and corresponding systems and methods described herein may be implemented as functionality programmed into any of a variety of circuitry, including programmable logic devices (PLDs), such as field programmable gate arrays (FPGAs), programmable array logic (PAL) devices, electrically programmable logic and memory devices and standard cell-based devices, as well as application specific integrated circuits (ASICs). Some other possibilities for implementing aspects of the systems and methods of monitoring a subject in a premise and corresponding systems and methods include: microcontrollers with memory (such as electronically erasable programmable read only memory (EEPROM)), embedded microprocessors, firmware, software, etc. Furthermore, aspects of the systems and methods of monitoring a subject in a premise and corresponding systems and methods may be embodied in microprocessors having software-based circuit emulation, discrete logic (sequential and combinatorial), custom devices, fuzzy (neural) logic, quantum devices, and hybrids of any of the above device types. Of course the underlying device technologies may be provided in a variety of component types, e.g., metal-oxide semiconductor field-effect transistor (MOSFET) technologies like complementary metal-oxide semiconductor (CMOS), bipolar technologies like emitter-coupled logic (ECL), polymer technologies (e.g., silicon-conjugated polymer and metal-conjugated polymer-metal structures), mixed analog and digital, etc.

It should be noted that any system, method, and/or other components disclosed herein may be described using computer aided design tools and expressed (or represented), as data and/or instructions embodied in various computer-readable media, in terms of their behavioral, register transfer, logic component, transistor, layout geometries, and/or other characteristics. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, e-mail, etc.) over the Internet and/or other computer networks via one or more data transfer protocols (e.g., HTTP, FTP, SMTP, etc.). When received within a computer system via one or more computer-readable media, such data and/or instruction-based expressions of the above described components may be processed by a processing entity (e.g., one or more processors) within the computer system in conjunction with execution of one or more other computer programs.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import, when used in this application, refer to this application as a whole and not to any particular portions of this application. When the word "or" is used in reference to a list of two or more items, that word covers all of the following interpretations of the word: any of the items in the list, all of the items in the list and any combination of the items in the list.

The above description of embodiments of the systems and methods of monitoring a subject in a premise and corresponding systems and methods is not intended to be exhaustive or to limit the systems and methods to the precise forms disclosed. While specific embodiments of, and examples for, the systems and methods of monitoring a subject in a premise and corresponding systems and methods are described herein for illustrative purposes, various equivalent modifications are possible within the scope of the systems and methods, as those skilled in the relevant art will recognize. The teachings of the systems and methods of monitoring a subject in a premise and corresponding systems and methods provided herein can be applied to other systems and methods, not only for the systems and methods described above.

The elements and acts of the various embodiments described above can be combined to provide further embodiments. These and other changes can be made to the systems and methods of monitoring a subject in a premise and corresponding systems and methods in light of the above detailed description.

We claim:

1. A system comprising:
at least one communications module, a wearable device, and an application running on a processor of a mobile computing device, wherein the at least one communications module, the wearable device and the application are configured to communicate through wireless communications, wherein each communications module of the at least one communications module is located in an environment;
each communications module of the at least one communications module configured to periodically transmit a unique identifying number corresponding to and identifying the transmitting communications module, wherein the application is configured to detect each unique identifying number of one or more communications modules selected from the at least one communications module;
the application configured to organize linking information, the organizing linking information comprising linking each unique identifying number of the one or more communications modules with a distance value and a function, wherein the application is configured to transmit the linking information to the wearable device;
the wearable device configured to detect a transmission of a communications module of the one or more communications modules, the wearable device configured to use information of the detected transmission to identify the unique identifying number of the communications module and to estimate a distance from the wearable device to the location of the communications module, the wearable device configured to use the linking information to identify the corresponding function and distance value, the wearable device configured to perform the function when the estimated distance meets at least one criterion with respect to the distance value.

2. The system of claim 1, wherein the wearable device is configured to store the linking information in a database.

3. The system of claim 2, the wearable device using the linking information comprising a database lookup.

4. The system of claim 1, wherein the application detecting each unique identifying number includes storing each unique identifying number.

5. The system of claim 1, wherein the at least one criterion comprises the estimated distance being less than the distance value.

6. The system of claim 1, wherein the at least one criterion comprises the estimated distance being greater than the distance value.

7. The system of claim 1, wherein the at least one criterion comprises the estimated distance being between a range of distance values.

8. The system of claim 1, wherein the wearable device comprises a collar.

9. The system of claim 8, wherein an animal wears the collar.

10. The system of claim 1, wherein the mobile computing device comprises one or more of a smartphone, tablet, and laptop computer.

11. The system of claim 1, wherein the performed function comprises logging information of the performed function.

12. The system of claim 11, wherein the logged information includes one or more of a time, an occurrence, and a duration of the performed function.

13. The system of claim 12, wherein the logging the information comprises associating the time and the occurrence with the unique identifying number of the communications module.

14. The system of claim 13, wherein the wearable device is configured to transmit the logged information to the application.

15. The system of claim 14, wherein the application is configured to provide access to the logged information through an electronic interface.

16. The system of claim 1, wherein the performed function comprises an avoidance function, wherein the avoidance function comprises applying a negative stimulus to a user of the wearable device.

17. The system of claim 1, wherein the performed function comprises a tracking function, wherein the tracking function comprises applying a positive stimulus to a user of the wearable device.

18. The system of claim 1, the linking each unique identifying number comprising linking each unique identifying number with a permitted time, the wearable device using the linking information to identify the corresponding permitted time, the wearable device performing the function when a time of the performing comprises the permitted time.

19. The system of claim 1, wherein the wireless communications comprises a Bluetooth low energy communications protocol.

20. The system of claim 1, wherein the at least one communications module comprises a Bluetooth enabled device.

21. The system of claim 1, wherein the wearable device comprises a Bluetooth enabled beacon.

22. The system of claim 1, wherein the application is configured to provide an electronic interface.

23. The system of claim 22, wherein the application detecting each unique identifying number of one or more communications modules selected from the at least one communications module comprising selecting the one or more communications modules using the electronic interface.

24. The system of claim 22, wherein the organizing linking information includes using the electronic interface to link each unique identifying number with a distance value and a function.

25. The system of claim 1, wherein one or more of the wearable device, the at least one communications module, and the mobile computing device are communicatively coupled via Wi-Fi connection to a local router, local area network or local personal area network.

26. The system of claim 25, wherein the coupling provides internet connectivity.

27. The system of claim 26, wherein the one or more of the wearable device, the at least one communications module, and the mobile computing device is communicatively coupled with a cloud computing platform comprising one or more applications running on at least one processor of a remote server.

28. The system of claim 1, wherein the one or more of the wearable device, the at least one communications module, and the mobile computing device at least one of transmit data to and receive data from the cloud computing platform.

29. A system comprising:
at least one communications module, a wearable device, and an application running on a processor of a mobile computing device, wherein the at least one communications module, the wearable device and the application are configured to communicate through wireless communications, wherein each communications module of the at least one communications module corresponds to a unique identifying number, wherein one or more communications modules of the at least one communications module is located in an environment;
the application configured to transmit to the wearable device identification information, the identification information comprising the corresponding unique identifying number for each communications module of the one or more communications modules, wherein the wearable device stores the identification information;
the application configured to transmit data to the one or more communications modules, the transmitting the data comprising transmitting a corresponding function and distance value for each communications module of the one or more communications modules;
a communications module of the one or more communications modules configured to periodically transmit the corresponding unique identifying number, the corresponding function and the corresponding distance value;
the wearable device configured to detect a transmission of the communications module, the wearable device configured to use information of the detected transmission to identify the unique identifying number of the communications module, the transmitted function, and the transmitted distance value, and to estimate a distance from the wearable device to the location of the communications module;
the wearable device configured to locate a presence of the unique identifying number in the stored identification information, wherein upon the locating, the wearable device is configured to compare the transmitted distance value with the estimated distance and perform the transmitted function when the estimated distance meets at least one criterion with respect to the transmitted distance value.

30. The system of claim 29, wherein the at least one criterion comprises the estimated distance being less than the transmitted distance value.

31. The system of claim 29, wherein the at least one criterion comprises the estimated distance being greater than the transmitted distance value.

32. The system of claim 29, wherein the at least one criterion comprises the estimated distance being between a range of transmitted distance values.

33. The system of claim 29, wherein the performed function comprises logging information of the performed function, wherein the logged information includes a time and an occurrence of the performed function.

34. The system of claim 33, wherein the logging the information comprises associating the time and the occurrence with the unique identifying number of the communications module.

35. The system of claim 29, wherein the performed function comprises an avoidance function, wherein the avoidance function comprises applying a negative stimulus to a user of the wearable device.

36. The system of claim 29, wherein the performed function comprises a tracking function, wherein the tracking function comprises applying a positive stimulus to a user of the wearable device.

37. A method comprising:
placing a wearable device on a subject that is mobile within an environment;
placing communications modules at one or more locations in the environment, wherein each communications module periodically transmits a unique identifying number corresponding to and identifying the transmitting communications module, wherein an application running on a processor of a mobile computing device detects and stores each unique identifying number of one or more communications modules selected from the at least one communications module, wherein the communications modules, the wearable device, and the application are communicatively coupled through wireless communications;
organizing linking information by linking each unique identifying number of the one or more communications modules selected from the at least one communications module with a distance value and a function, wherein the organizing comprises the application organizing the linking information and transmitting the linking information to the wearable device;
the wearable device detecting a transmission of a communications module of the one or more communications modules;
the wearable device using information of the detected transmission to identify the unique identifying number of the communications module and to estimate a distance from the wearable device to a location of the communications module;
the wearable device using the linking information to identify the function and distance value corresponding to the communications module;
the wearable device performing the function when the estimated distance meets at least one criterion with respect to the distance value.

38. The system of claim 37, wherein the at least one criterion comprises the estimated distance being less than the distance value.

39. The system of claim 37, wherein the at least one criterion comprises the estimated distance being greater than the distance value.

40. The system of claim 37, wherein the at least one criterion comprises the estimated distance being between a range of distance values.

41. A method comprising:
placing a wearable device on a subject that is mobile within an environment;
placing one or more communications modules at one or more locations in the environment;

one or more applications running on at least one processor of a mobile computing device transmitting identification information to the wearable device, wherein the one or more communications modules, the wearable device and the one or more applications are communicatively coupled through wireless communications, the identification information comprising a corresponding unique identifying number for each communications module of the one or more communications modules, wherein the wearable device stores the identification information;

the one or more applications transmitting data to a communications module of the one or more communications modules, wherein the data comprises a function and a distance value;

the communications module periodically transmitting the corresponding unique identifying number, the function and the distance value;

the wearable device detecting a transmission of the communications module, the wearable device using information of the detected transmission to identify the corresponding unique identifying number of the communications module, the transmitted function, and the transmitted distance value, and to estimate a distance from the wearable device to the location of the communications module;

the wearable device locating a presence of the unique identifying number in the stored identification information, wherein upon the locating, the wearable device compares the transmitted distance value with the estimated distance and performs the transmitted function when the estimated distance meets at least one criterion with respect to the distance value.

* * * * *